US012738612B2

(12) United States Patent
Huang

(10) Patent No.: US 12,738,612 B2
(45) Date of Patent: Sep. 15, 2026

(54) BATTERY MODULE AND ENERGY STORAGE APPARATUS

(71) Applicant: Hithium Tech HK Limited, HongKong (CN)

(72) Inventor: Yingxiong Huang, Xiamen (CN)

(73) Assignee: Hithium Tech HK Limited, HongKong (CN)

( * ) Notice: Subject to any disclaimer, the term of this patent is extended or adjusted under 35 U.S.C. 154(b) by 946 days.

(21) Appl. No.: 17/963,171

(22) Filed: Oct. 10, 2022

(65) Prior Publication Data

US 2023/0207991 A1 Jun. 29, 2023

(30) Foreign Application Priority Data

Dec. 23, 2021 (CN) ........................ 202123269356.X

(51) Int. Cl.
*H01M 50/572* (2021.01)
*H01M 50/209* (2021.01)
*H01M 50/258* (2021.01)
*H01M 50/543* (2021.01)

(52) U.S. Cl.
CPC ....... *H01M 50/572* (2021.01); *H01M 50/209* (2021.01); *H01M 50/258* (2021.01); *H01M 50/543* (2021.01)

(58) Field of Classification Search
None
See application file for complete search history.

(56) References Cited

U.S. PATENT DOCUMENTS

2010/0190050 A1* 7/2010 Ochi .................. H01M 50/293
429/160
2017/0222251 A1* 8/2017 Lee .................. H01M 10/0481
2019/0288264 A1* 9/2019 Fujita .................. H01R 11/288
2020/0313141 A1* 10/2020 Liu ....................... H01R 25/14
2020/0403329 A1* 12/2020 Durse .................... H01R 11/09
2022/0094012 A1* 3/2022 Liu ..................... H01M 50/296
2023/0086233 A1* 3/2023 Que ...................... H01M 50/55
429/100

FOREIGN PATENT DOCUMENTS

WO WO-2020244308 A1 * 12/2020 .......... H01M 50/296

* cited by examiner

*Primary Examiner* — Wyatt P Mcconnell
*Assistant Examiner* — Joshua P Mcclure

(57) ABSTRACT

Provided are a battery module and an energy storage apparatus. The battery module includes: a main body including a plurality of batteries that are electrically connected to each other, the main body having an output terminal; at least one end plate disposed on at least one end of the main body and isolated from the main body by an insulating member; and an insulative base installed on the at least one end plate, the base having an installation groove defined thereon, the installation groove having a rib protruding from a bottom thereof, the rib defining an accommodating groove. A circumferential side wall of the base has an installation opening in communication with the accommodating groove, at least a part of the output terminal extends into the accommodating groove through the installation opening, and the output terminal is electrically connected to the at least one end plate.

16 Claims, 3 Drawing Sheets

BATTERY MODULE AND ENERGY STORAGE APPARATUS

FIELD

The present disclosure relates to the technical field of energy storage, in particular to a battery module and an energy storage apparatus.

BACKGROUND

In the related art, a battery module includes a plurality of batteries that are assembled together to form an integral body. The integral body has an end plate provided on an end portion thereof, and the end plate is insulated from the integral body formed by the plurality of batteries. The integral body formed by the plurality of batteries has an output terminal configured to be electrically connected to a control component to control the charging and discharging of the plurality of batteries. The output terminal and the end plate need to meet a certain safety distance to ensure the safety of the battery module.

SUMMARY

The embodiments of the present disclosure provide a battery module and an energy storage apparatus.

A battery module according to embodiments of the present disclosure includes: a main body, at least one end plate, and a base. The main body includes a plurality of batteries that are electrically connected to each other. The main body has an output terminal. The at least one end plate is disposed at at least one end of the main body and isolated from the main body by an insulating member. The base is insulative and installed on the at least one end plate. The base has an installation groove defined thereon. The installation groove has a rib protruding from a bottom thereof. The rib defines an accommodating groove. A circumferential side wall of the base has an installation opening in communication with the accommodating groove. At least a part of the output terminal extends into the accommodating groove through the installation opening. The output terminal is electrically connected to the at least one end plate.

In the above battery module, the rib is arranged in the installation groove, and at least a part of the output terminal is located in the accommodating groove defined by the rib, so that the electrical safety clearance between the output terminal and the at least one end plate is increased, the creepage distance is increased, and thus the safety of the battery module is ensured.

In some embodiments, the installation groove is tapered in a direction from a groove opening of the installation groove to the bottom of the installation groove.

In some embodiments, a shape of the accommodating groove is adapted to a shape of the part of the output terminal in the accommodating groove.

In some embodiments, the rib is spaced apart from an inner side surface of the installation groove.

In some embodiments, the accommodating groove has a first through hole defined in the bottom thereof, the output terminal has a second through hole defined therein, and a position of the first through hole corresponds to a position of the second through hole. The battery module further includes a fastener that is conductive, and the fastener penetrates through the first through hole and the second through hole and is connected to the at least one end plate.

In some embodiments, the base includes an installation portion having the installation groove defined thereon, and an insertion portion connected to a bottom of the installation portion. The at least one end plate has an insertion hole defined therein, the insertion portion being inserted into the insertion hole.

In some embodiments, the installation portion has an elastic snap portion provided on a bottom thereof. The at least one end plate has a snap hole defined therein, the snap portion being engaged in the snap hole to fix the base on the at least one end plate.

In some embodiments, the snap portion is spaced apart from the insertion portion.

In some embodiments, the snap hole is defined on an outer side of the at least one end plate, and the snap portion is engaged in the snap hole from the outer side of the at least one end plate.

An energy storage apparatus according to embodiments of the present disclosure includes the battery module of any of the above embodiments.

In the above energy storage apparatus, the rib is arranged in the installation groove, and at least a part of the output terminal is located in the accommodating groove defined by the rib, so that the electrical safety clearance between the output terminal and the at least one end plate is increased, the creepage distance is increased, and thus the safety of the battery module is ensured.

Additional aspects and advantages of the present disclosure will be set forth, in part, from the following description, and in part will be apparent from the following description, or learned by practice of the present disclosure.

BRIEF DESCRIPTION OF DRAWINGS

The above and/or additional aspects and advantages of the present disclosure will become apparent and readily understood from the following description of embodiments in conjunction with the accompanying drawings, in which.

DESCRIPTION OF EMBODIMENTS

Figure 1:
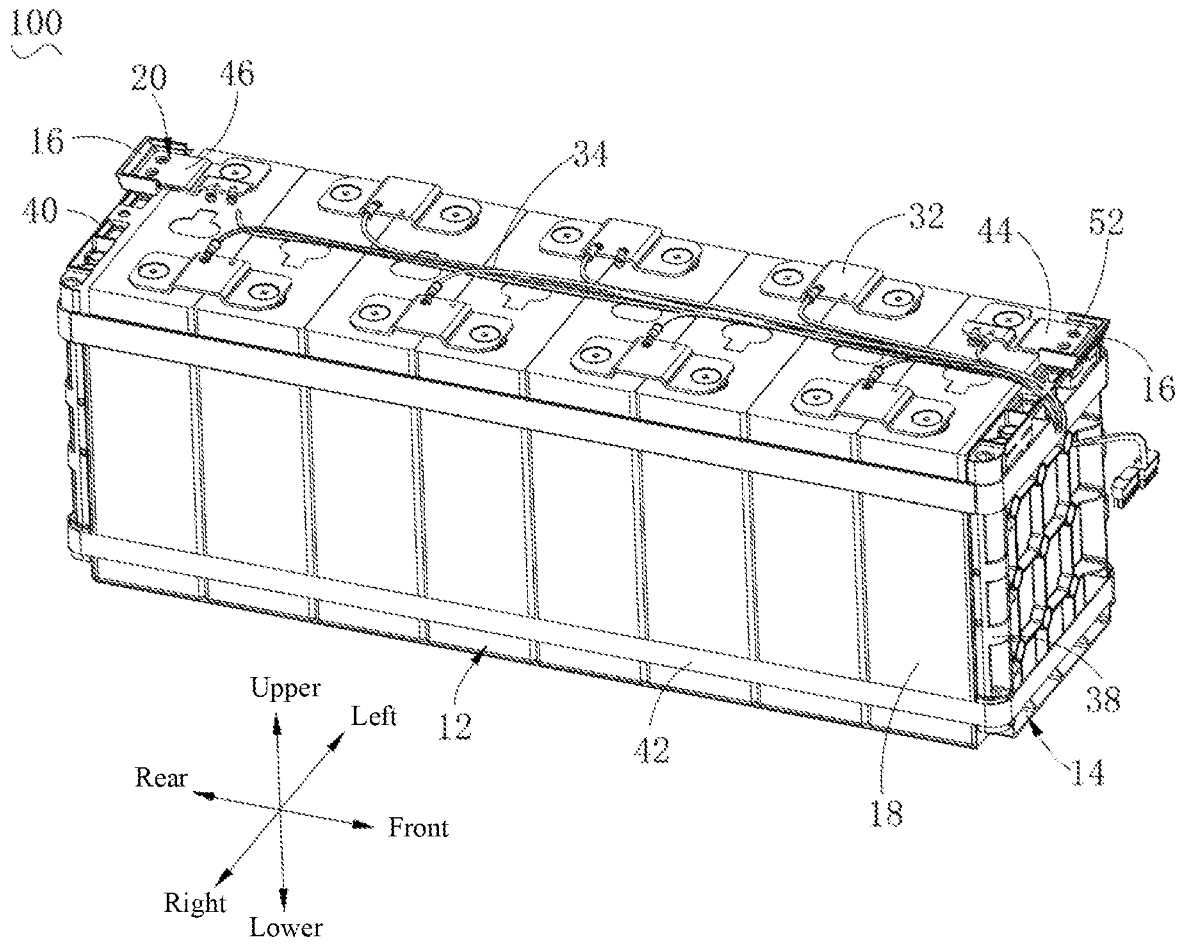
FIG. 1 is a schematic perspective view of a battery module according to embodiments of the present disclosure.

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the present disclosure, but should not be construed as limiting the present disclosure.

In the present disclosure, a first feature "on" or "under" a second feature may mean that the first feature is in direct contact with the second feature, or the first and second features are not in direct contact but are in contact through additional features between them. In addition, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is lower than that of the second feature.

Different embodiments or examples are provided below for implementing different structures of the present disclosure. In order to simplify the disclosure of the embodiments of the present disclosure, components and arrangements of specific examples are provided below. Of course, the components and arrangements are examples only, and are not intended to limit the present disclosure. Furthermore, reference numerals and/or reference letters can be repeated in different examples of the present disclosure for a purpose of simplification and clearness, rather than indicating relationships between various embodiments and/or arrangements discussed herein. In addition, the present disclosure provides examples of various specific processes and materials, but the applicability of other processes and/or application of other materials may be appreciated by those skilled in the art.

Referring to FIGS. 1 to 5, a battery module 100 according to embodiments of the present disclosure includes a main body 12, at least one end plate 14, and a base 16. The main body 12 includes a plurality of batteries 18 that are electrically connected to each other. The main body 12 has an output terminal 20. The at least one end plate 14 is disposed at at least one end of the main body 12, and isolated from the main body 12 by an insulating member 22.

The base 16 is insulative and installed on the end plate 14. The base 16 has an installation groove 24 defined thereon. The installation groove 24 has a rib 26 protruding from a bottom thereof, and the rib 26 defines an accommodation groove 28. A circumferential side wall 29 of the base 16 has an installation opening 30 in communication with the accommodating groove. At least a part of the output terminal 20 extends into the accommodating groove 28 through the installation opening 30. The output terminal 20 is electrically connected to the end plate 14.

In the above battery module 100, the rib 26 is arranged in the installation groove 24, and at least a part of the output terminal 20 is located in the accommodating groove 28 defined by the rib 26, so that an electrical safety clearance between the output terminal 20 and the end plate 14 is increased, a creepage distance is increased, and thus the safety of the battery module 100 is ensured.

Specifically, in the illustrated embodiments, the battery 18 is a square battery. In other embodiments, the battery 18 may be a cylindrical battery, or a battery of other shapes. The battery 18 may be a lithium battery or a battery of other types. The battery 18 may be a rechargeable battery or a non-rechargeable battery, which is not specifically limited here.

The plurality of batteries 18 may be arranged in a row-column distribution manner. In one embodiment, the plurality of batteries 18 is arranged in a battery row. Two terminals are arranged on the top of each battery 18. One of the two terminals is a positive terminal and the other is a negative terminal. In one embodiment, all batteries 18 in a battery row are connected in series by electrode patches 32 (e.g., aluminum bar). Of course, the plurality of batteries 18 may be connected in parallel or in series-parallel.

Figure 2:
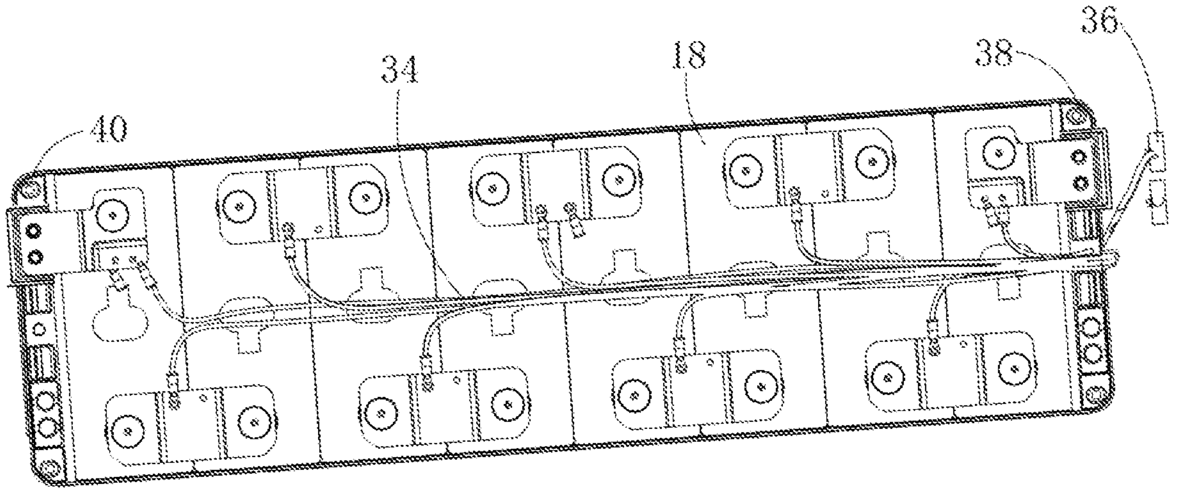
FIG. 2 is a schematic top view of a battery module according to embodiments of the present disclosure.
Figure 3:
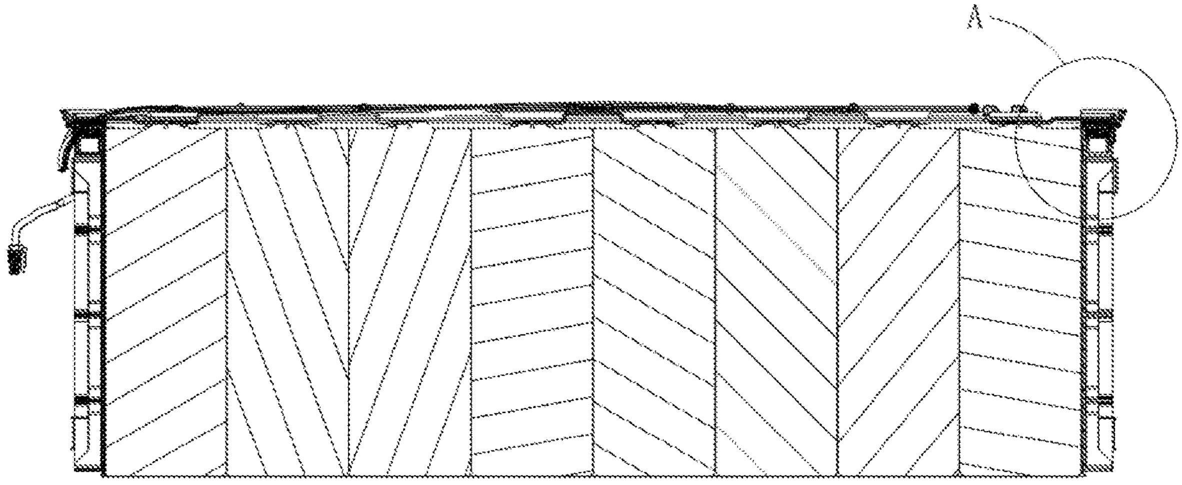
FIG. 3 is a schematic cross-sectional view of a battery module according to embodiments of the present disclosure.

The electrical connection between the plurality of batteries 18 may be achieved through wire harnesses 34 and aluminum bars (CCS assembly). Specifically, one end of each aluminum bar is welded to a terminal of one battery 18, and the other end of the aluminum bar is welded to a terminal of another battery 18. The wire harnesses 34 are connected to the aluminum bars between the batteries 18 to collect the temperature, voltage, and current of the plurality of batteries 18 and control the charging and discharging of the plurality of batteries 18, etc. The battery module 100 further includes a plug 36 configured to connect the wiring harnesses 34. As shown in FIG. 2, the plug 36 may be easily connected to other electrical components to transmit the collected data and control signals.

In the illustrated embodiment, the main body 12 includes two end portions: a front end portion and a rear end portion, each of which is mounted with one end plate 14. The end plate 14 at the front end portion is a first end plate 38, and the end plate 14 at the rear end portion is a second end plate 40. The first end plate 38 and the second end plate 40 are each isolated from the main body 12 by an insulating member 22. The end plate 14 and the batteries 18 may be bound together by a band 42.

At least a part of the end plate 14 is conductive, for example, the entire end plate 14 may be conductive, or a part of the end plate 14 may be conductive. The main body 12 has two output terminals 20, a first output terminal 44 is located at the front end of the main body 12, and the second output terminal 46 is located at the rear end of the main body 12. The conductive part of the first end plate 38 may be electrically connected to the main body 12 through the first output terminal 44 at the front end of the main body 12, and the conductive part of the second end plate 40 may be electrically connected to the main body 12 through the second output terminal 46 at the rear end of the main body 12. The first output terminal 44 and the second output terminal 46 may serve as electric energy output terminals 20 of the main body 12.

It may be understood that in other embodiments, the number of the output terminals 20 is not limited to two, and may be specifically set according to the actual situation of the main body 12. Alternatively, both the first output terminal 44 and the second output terminal 46 may be provided at the front end or the rear end, which is not specifically limited herein.

The base 16 is insulative, and the base 16 may be made of plastic. In one embodiment, the entire base 16 may be fabricated from plastic through an injection molding process.

Figure 4:
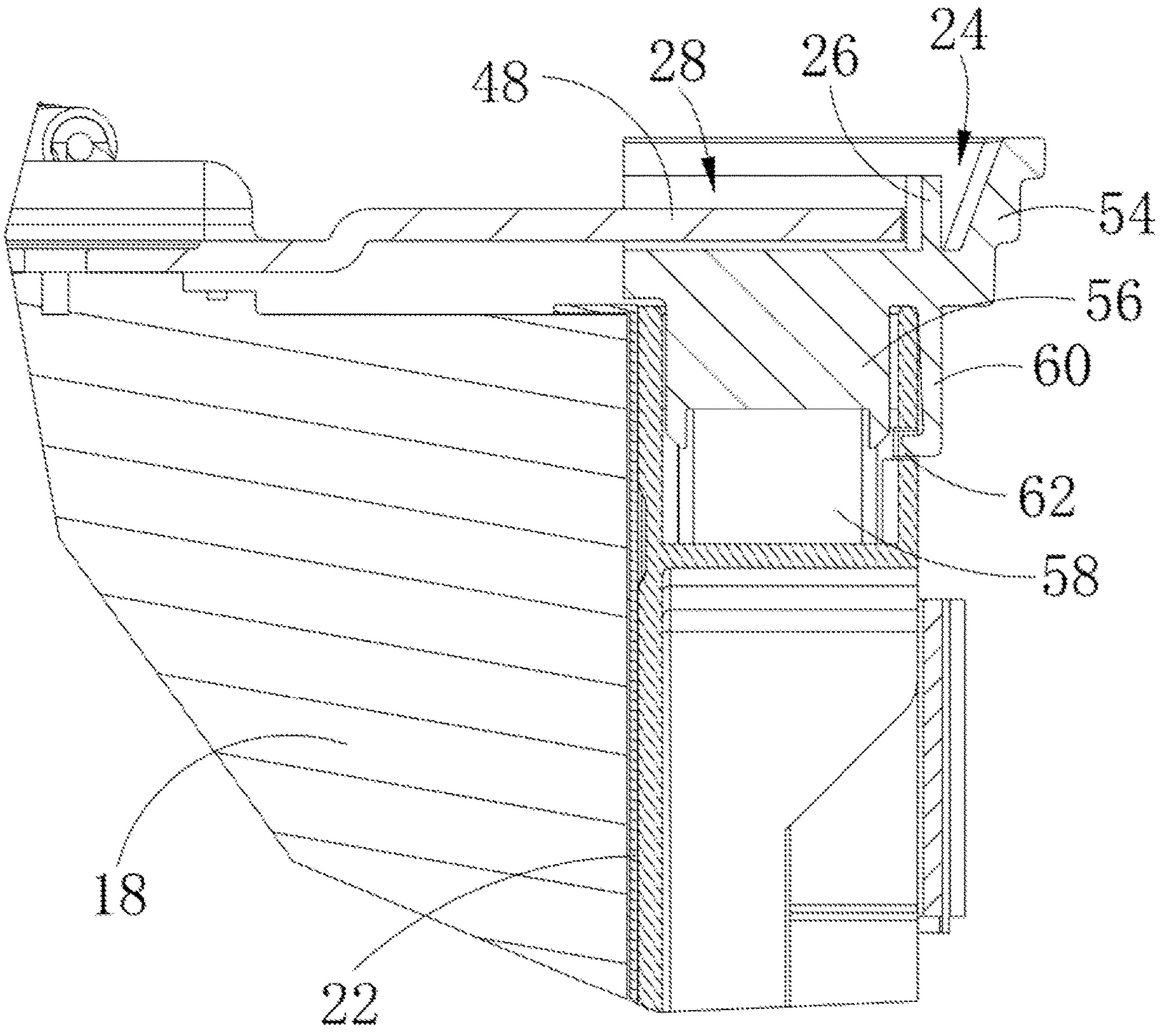
FIG. 4 is an enlarged schematic diagram of a part A of FIG. 3.
Figure 5:
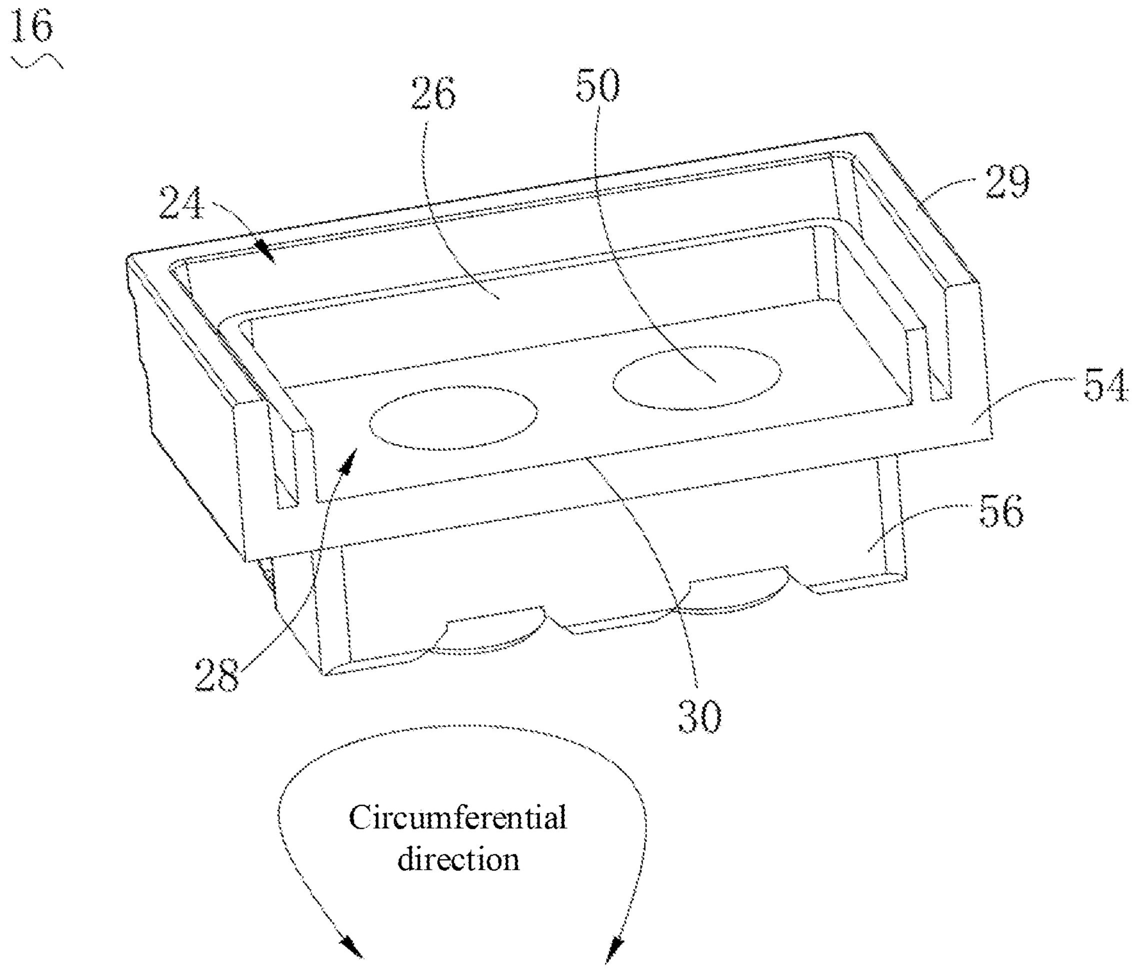
FIG. 5 is a schematic structural diagram of a base according to embodiments of the present disclosure.

The installation opening 30 is opened in a circumferential side wall 29 of the base 16, and the installation opening 30 is in communication with the accommodating groove 28 and the installation groove 24. Therefore, the output terminal 20 can be installed into the installation groove 24 from top to bottom. Referring to FIG. 4, the output terminal 20 has a flat plate-like portion 48, and a part of the flat plate-like portion 48 may extend into the accommodating groove 28 substantially horizontally. In this way, the length and assembly difficulty of the output terminal 20 can be reduced. Referring to FIG. 2, a circumferential direction may be a clockwise or counterclockwise direction.

At least a part of the output terminal 20 is accommodated in the accommodating groove 28, and the part of the output terminal 20 located in the accommodating groove 28 and the end plate 14 need to maintain a certain electrical safety clearance to meet the creepage distance requirement. In this embodiment, with the rib 26 protruding in the installation groove 24, an insulating barrier is added between the output terminal 20 and the end plate 14, thereby increasing the electrical safety clearance between the output terminal 20 and the end plate 14, increasing the creepage distance, and improving the safety of the battery module 100. In addition, since the rib 26 protrudes from the bottom of the installation groove 24, the rib 26 may also play a reinforcing role to ensure the structural strength of the base 16.

In some embodiments, the installation groove 24 is tapered in a direction from a groove opening of the installation groove 24 to the bottom of the installation groove 24. In this way, the installation of the output terminal 20 is facilitated.

Specifically, during installation, the plurality of batteries 18 and the end plate 14 are assembled together first, the base 16 is installed on an upper side of the end plate 14, and then the output terminal 20 is installed. Since the installation groove 24 is tapered along the direction from the groove opening of the installation groove 24 to the bottom of the installation groove 24, the output terminal 20 can be easily aligned into the installation groove 24 and then enter the accommodating groove 28, thereby improving the installation efficiency of the battery module 100.

In some embodiments, the accommodating groove 28 has a shape adapted to a shape of the part of the output terminal 20 in the accommodating groove 28. In this way, the safety of the battery module 100 can be further improved.

Specifically, the shape of the accommodating groove 28 is adapted to a shape of the part of the output terminal 20 located in the accommodating groove 28, so that the circumferential side wall of the accommodating groove 28 can better surround the circumferential side of the part of the output terminal 20 located in the accommodating groove 28, thereby increasing electrical safety clearances at various angles in the circumferential direction, and further improving the safety of the battery module 100.

In the illustrated embodiment, the part of the output terminal 20 located in the accommodating groove 28 is square, and the accommodating groove 28 is correspondingly square. Besides, the circumferential side wall of the accommodating groove 28 is spaced apart from a circumferential side of the output terminal 20, which further facilitates the installation of the output terminal 20.

In some embodiments, the rib 26 is spaced apart from an inner side surface of the installation groove 24 by a certain distance. In this way, the safety of the battery module 100 can be further improved.

Specifically, the rib 26 is spaced apart from the inner side surface of the installation groove 24 by a certain distance, so that the distance between the part of the output terminal 20 located in the accommodating groove 28 and the installation groove 24 increases, thereby increasing the distance between the part of the output terminal 20 in the accommodating groove 28 and the end plate 14, further improving the safety of the battery module 100.

It can be understood that the specific size of the distance may be determined based on the size requirements of the battery module 100, the creepage distance requirements and other factors.

In some embodiments, the accommodating groove 28 has a first through hole 50 defined in the bottom thereof, the output terminal 20 has a second through hole 52 defined therein, and a position of the first through hole 50 corresponds to a position of the second through hole 52. The battery module 100 further includes a fastener (not shown) that is conductive, and the fastener penetrates through the first through hole 50 and the second through hole 52 and is connected to the end plate. In this way, the output terminal 20 can be fixed and electrically connected to the end plate 14.

Specifically, in one embodiment, the fastener may be a bolt. The bolt fixes the output terminal 20, and the bolt 20 enables the output terminal 20 to be electrically connected to the end plate 14.

In other embodiments, the fastener may be other fasteners such as pins. The fastener may be electrically conductive.

In addition, the accommodating groove 28 defined by the rib 26 may also limit the output terminal 20, so that the first through hole 50 and the second through hole 52 can be easily aligned.

In some embodiments, the base 16 includes an installation portion 54 and an insertion portion 56, the insertion portion 56 is connected to a bottom of the installation portion 54, the installation portion 54 has the installation groove 24 defined thereon, the end plate 14 has an insertion hole 58 defined therein, and the insertion portion 56 is inserted into the insertion hole 58. In this way, the positioning and installation of the base 16 are facilitated.

Specifically, the installation portion 54 can accommodate a part of the output terminal 20, and the insertion hole 58 is defined on the upper side of the end plate 14. When installing the base 16, the insertion portion 56 may be inserted into the insertion hole 58 first, so that the base 16 is positioned and installed at a predetermined position of the end plate 14. Then, the output terminal 20 is installed so that one end of the output terminal 20 is connected to the electrode of the battery 18 and the other end of the output terminal 20 is located in the installation groove 24. Then, the output terminal 20 is locked and electrically connected to the end plate 14 by means of the fastener.

In some embodiments, the installation portion 54 has an elastic snap portion 60 provided on a bottom thereof, the end plate 14 has a snap hole 62 defined therein, and the snap portion 60 is engaged in the snap hole 62 to fix the base 16 on the end plate 14. In this way, the base 16 can be pre-fixed.

Specifically, after the base 16 is installed at the position of the insertion hole 58 of the end plate 14, the base 16 may move to affect the fixing of the output terminal 20. Therefore, the base 16 is pre-fixed by the snap portion 60 engaged in the snap hole 62 to facilitate other operations such as fixing of the output terminal 20. Moreover, the elastic snap portion 60 also makes the base 16 detachable, which facilitates the maintenance and replacement of components.

In some embodiments, the snap portion 60 is spaced apart from the insertion portion 56 by a certain distance. In this way, the engagement of the snap portion 60 into the snap hole 62 is facilitated.

Specifically, the snap portion 60 is spaced apart from the insertion portion 56 by a certain distance, a space is defined between the snap portion 60 and the insertion portion 56, and a side wall of the insertion hole 58 can be inserted into the space. The side wall of the insertion hole 58 may be sandwiched and supported between the snap portion 60 and the insertion portion 56, and the snap portion 60 may reach the snap hole 62 along an outer surface of the side wall to be engaged in the snap hole 62.

In some embodiments, the snap hole 62 is defined on an outer side of the end plate 14, and the snap portion 60 is engaged in the snap hole 62 from the outer side of the end plate 14. In this way, the installation and disassembling of the base 16 are facilitated.

Specifically, on the one hand, when the base 16 is installed on the end plate 14, the snap hole 62 on the outer side of the end plate 14 may be easily observed by the operator, to align the snap portion 60 with the snap hole 62. On the other hand, when disassembling the base 16, it also facilitates the operator to use a tool to disengage the snap portion 60 from the snap hole 62.

In some embodiments, the accommodating groove 28 has a depth greater than a thickness of the output terminal 20. In this way, the creepage distance between the end plate 14 and the output terminal 20 can be increased.

Specifically, the side wall of the accommodating groove 28 is higher than the top of the output terminal 20 in the circumferential direction, and surrounds the output terminal 20 in the circumferential direction, which can increase the creepage distance between the end plate 14 and the output terminal 20.

An energy storage apparatus according to embodiments of the present disclosure includes the battery module 100 of any of the above embodiments.

In the above energy storage apparatus, the rib 26 is arranged in the installation groove 24, and at least a part of the output terminal 20 is located in the accommodating groove 28 defined by the rib 26, which increases the electrical safety clearance between the output terminal 20 and the end plate 14, increases the creepage distance, and thus ensures the safety of the battery module 100.

Specifically, the energy storage apparatus may include at least one battery module 100. When the energy storage apparatus includes a plurality of battery modules 100, the plurality of battery modules 100 may be electrically connected in series, in parallel, or in series-parallel.

In one embodiment, the plurality of battery modules 100 may be placed on a cluster frame, and the cluster frame with the plurality of battery modules 100 may be placed in a small container to form a small container-type energy storage apparatus.

In one embodiment, one or more battery modules 100 may be placed in a cabinet to form a household energy storage cabinet type energy storage apparatus. Of course, in other embodiments, the energy storage apparatus may be made into other forms of energy storage apparatuses, and is not limited to the form of a small container and the form of a household energy storage cabinet.

Throughout this specification, description with reference to “an embodiment”, “some embodiments”, “illustrative embodiments”, “an example”, “a specific example”, or “some examples” means that a particular feature, structure, material, or characteristic described in connection with the embodiment or example is included in at least one embodiment or example of the present disclosure. The appearances of the above phrases in various places throughout this disclosure are not necessarily referring to the same embodiment or example of the present disclosure. Furthermore, the particular features, structures, materials, or characteristics described here may be combined in any suitable manner in any one or more embodiments or examples.

Although the embodiments of the present disclosure have been shown and described above, it can be understood that the above embodiments are exemplary and should not be construed as limiting the present disclosure. Those of ordinary skill in the art can make changes, modifications, substitutions and variations to the above embodiments within the scope of the present disclosure.

What is claimed is:

1. A battery module, comprising:

a main body comprising a plurality of batteries that are electrically connected to each other, the main body having an output terminal;

at least one end plate disposed at at least one end of the main body and isolated from the main body by an insulating member; and a base that is insulative and installed on the at least one end plate, wherein the base has an installation groove defined thereon, the installation groove having a rib protruding from a bottom thereof, the rib defining an accommodating groove, wherein the rib is arranged in the installation groove and spaced apart from an inner circumferential surface of the installation groove, wherein a circumferential side wall of the base has an installation opening in communication with the accommodating groove, at least a part of the output terminal extending into the accommodating groove through the installation opening, and wherein the output terminal is electrically connected to the at least one end plate.

2. The battery module according to claim 1, wherein the installation groove is tapered in a direction from a groove opening of the installation groove to the bottom of the installation groove.

3. The battery module according to claim 1, wherein a shape of the accommodating groove is adapted to a shape of the part of the output terminal in the accommodating groove.

4. The battery module according to claim 1, wherein the accommodating groove has a first through hole defined in the bottom thereof, wherein the output terminal has a second through hole defined therein, and wherein the battery module further comprises a fastener that is conductive, the fastener penetrating through the first through hole and the second through hole and being connected to the at least one end plate.

5. The battery module according to claim 1, wherein the base comprises an installation portion having the installation groove defined thereon, and an insertion portion connected to a bottom of the installation portion, and wherein the at least one end plate has an insertion hole defined therein, the insertion portion being inserted into the insertion hole.

6. The battery module according to claim 5, wherein the installation portion has an elastic snap portion provided on a bottom thereof, and wherein the at least one end plate has a snap hole defined therein, the snap portion being engaged in the snap hole to fix the base on the at least one end plate.

7. The battery module according to claim 6, wherein the snap portion is spaced apart from the insertion portion.

8. The battery module according to claim 6, wherein the snap hole is defined on an outer side of the at least one end plate, and wherein the snap portion is engaged in the snap hole from the outer side of the at least one end plate.

9. An energy storage apparatus, comprising the battery module according to claim 1.

10. The energy storage apparatus according to claim 9, wherein the installation groove is tapered in a direction from a groove opening of the installation groove to the bottom of the installation groove.

11. The energy storage apparatus according to claim 9, wherein a shape of the accommodating groove is adapted to a shape of the part of the output terminal in the accommodating groove.

12. The energy storage apparatus according to claim 9, wherein the accommodating groove has a first through hole defined in the bottom thereof, wherein the output terminal has a second through hole defined therein, and wherein the battery module further comprises a fastener that is conductive, the fastener penetrating through the first through hole and the second through hole and being connected to the at least one end plate.

13. The energy storage apparatus according to claim 9, wherein the base comprises an installation portion having the installation groove defined thereon, and an insertion portion connected to a bottom of the installation portion, and wherein the at least one end plate has an insertion hole defined therein, the insertion portion being inserted into the insertion hole.

14. The energy storage apparatus according to claim 13, wherein the installation portion has an elastic snap portion provided on a bottom thereof, and wherein the at least one end plate has a snap hole defined therein, the snap portion being engaged in the snap hole to fix the base on the at least one end plate.

15. The energy storage apparatus according to claim 14, wherein the snap portion is spaced apart from the insertion portion.

16. The energy storage apparatus according to claim 14, wherein the snap hole is defined on an outer side of the at least one end plate, and wherein the snap portion is engaged in the snap hole from the outer side of the at least one end plate.

* * * * *